United States Patent [19]

Hanusa

[11] Patent Number: 5,753,155
[45] Date of Patent: May 19, 1998

[54] GATING FOR PRODUCTION OF RIGID POLYURETHANE FOAM

[75] Inventor: Lotar H. Hanusa, Pittsburgh, Pa.

[73] Assignee: Bayer Corporation, Pittsburgh, Pa.

[21] Appl. No.: 646,598

[22] Filed: May 8, 1996

[51] Int. Cl.$^6$ .................. B29C 44/06; B29C 44/12
[52] U.S. Cl. .................. 264/46.5; 264/46.6; 264/328.12
[58] Field of Search .................. 264/46.5, 46.6, 264/328.12

[56] References Cited

U.S. PATENT DOCUMENTS

| | | | |
|---|---|---|---|
| 3,991,147 | 11/1976 | Knipp et al. | 264/51 |
| 4,204,612 | 5/1980 | Schrader et al. | 264/46.5 |
| 4,303,728 | 12/1981 | Houdek et al. | 428/315 |
| 4,379,103 | 4/1983 | Doerfling | 264/46.5 |
| 4,419,307 | 12/1983 | Kohara et al. | |

FOREIGN PATENT DOCUMENTS

| | | | |
|---|---|---|---|
| 56-118830 | 9/1981 | Japan | 264/46.5 |
| 57-59731 | 4/1982 | Japan | 264/46.5 |
| 57-123030 | 7/1982 | Japan | 264/46.5 |

*Primary Examiner*—Allan R. Kuhns
*Attorney, Agent, or Firm*—Joseph C. Gil; Noland J. Cheung

[57] ABSTRACT

The present invention is directed to an improved method for preparing a product by introducing a rigid polyurethane foam formulation into a cavity defined by two spaced apart formed sheets and allowing the formulation to foam. In one embodiment, the improvement resides in providing at least one of the sheets with a portion having the shape of a gate of the type used in polyurethane reaction injection molding and introducing the formulation through that gate so that the formulation enters the cavity as a laminar stream.

3 Claims, 1 Drawing Sheet

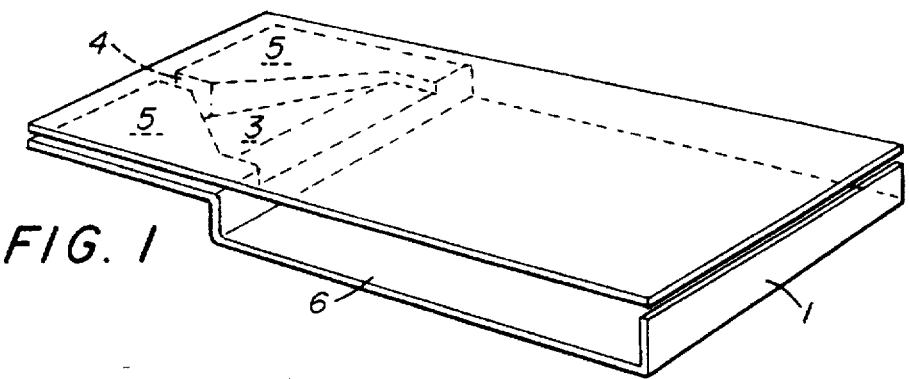
FIG. 1
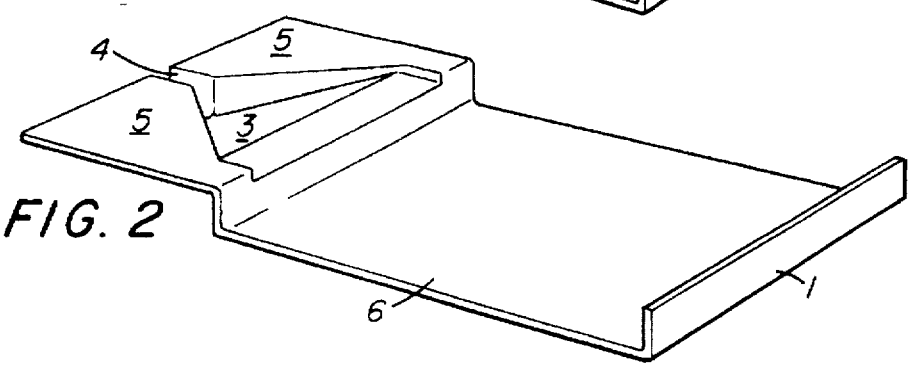
FIG. 2
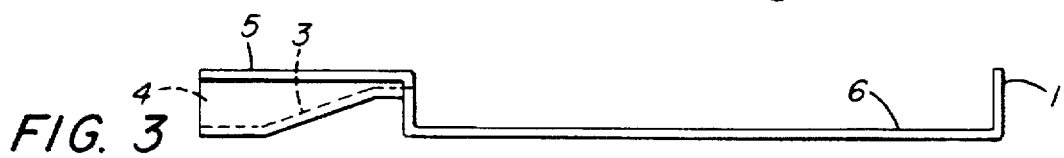
FIG. 3
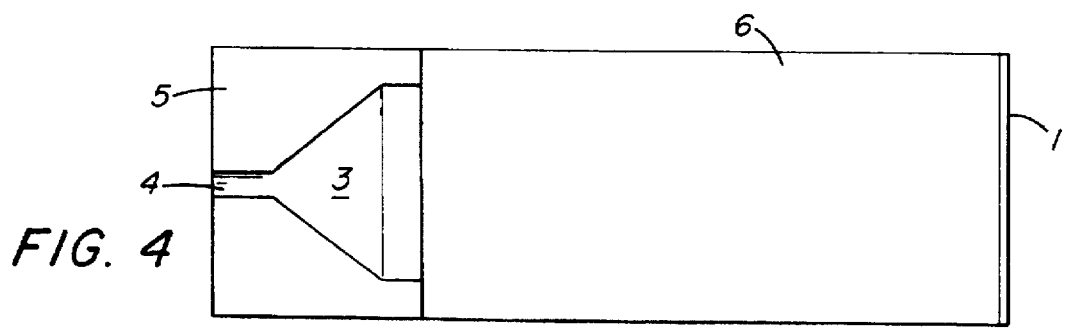
FIG. 4
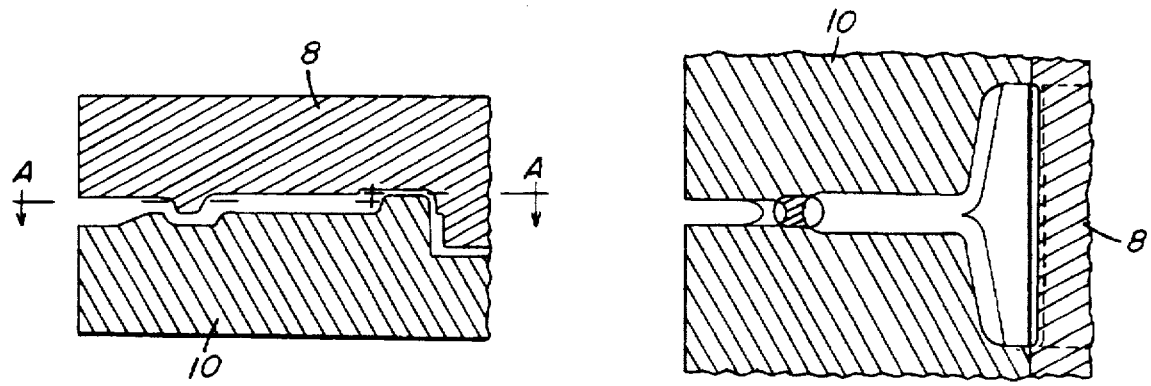
FIG. 5
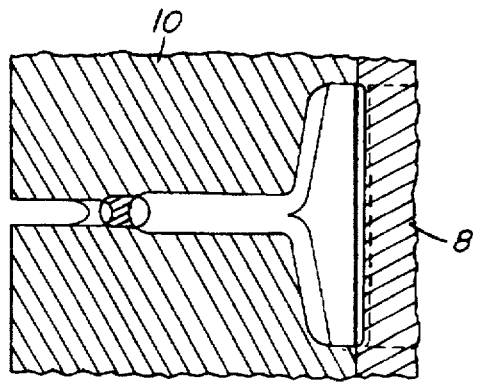
FIG. 6 A-A

GATING FOR PRODUCTION OF RIGID POLYURETHANE FOAM

BACKGROUND OF THE INVENTION

Rigid foam applications have struggled for many years with problems caused by liquid turbulence and splashing of the chemical stream into the part being foamed. The net result of this turbulence is the entrainment of air in the chemical stream, splashing of chemicals on to the internal part surfaces, uneven distribution of chemicals, and mixing of already reacting chemicals with new materials being introduced into the part. Depending on the size and complexity of the part, this results in surface voids, air entrapment, weak sub-surface areas and flow restrictions. The consequences can be poor surface quality, reduced physical properties, and potential of blister formation or even catastrophic failure.

In the rigid and flexible molded area, this turbulence has, in some cases, been reduced by specially designed mixheads. Unfortunately these mixheads are very costly, generally lose their effectiveness with high output foam machines, and often cannot be used because of their large size and complexity. In the RIM area, a sophisticated gating technology has been developed to assist in mixing and directing liquid chemicals so that these flow into molds in laminar fashion (see, e.g., U.S. Pat. No. 3,991,147). These so-called gates are typically precision machined into the mold or into a steel block permanently attached to the mold. When the part is demolded, the runner is removed along with the final part. Typical molded rigid foam applications have not been able to take advantage of this technology. This is primarily due to the fact that fully assembled parts, such as doors, refrigerators, trailer sections, refrigerated warehouse panels and the like are first placed into a press or containment device. Once the part is in place, the interior of the part is not readily accessible. As a result, the chemicals are injected in such a way that traditional closed mold mounted gates generally cannot be used.

In a typical rigid foam molding application, the part or panel to be produced is placed into a press or fixture. Foam chemicals are then introduced through a small hole in the part or panel. The hole is plugged and after curing, the finished part is removed from the press or fixture. In fact, the input holes are often so small and restrictive as to cause additional turbulence or splattering of the foam chemicals into the part.

In many cases, subsurface voids have been considered unavoidable and a cosmetic defect that has to be accepted. In large flat panels, such as doors, refrigerated warehouse cooler panels, architectural building panels, and the like, subsurface voids have contributed to blister formation and delamination or have resulted in a high reject rate.

In more demanding applications, such as boat hulls and structural sandwich panels, concerns for blisters and delamination have limited the use of urethanes. Voids at the foam/facing interface can deleteriously affect foam to facing adhesion, energy performance, corrosion resistance and in some cases the structural integrity of the final composite part. In some applications, monitoring for voids and energy usage in service is required.

In short, any improvements in reducing air entrapment and subsurface voids can significantly improve the quality of parts in many molded applications. The use of low cost gates which can be used once and removed or left in place now provides one solution to this problem.

BRIEF DESCRIPTION OF THE DRAWINGS

FIG. 1 is a perspective of one gating arrangement according to the present invention.

FIG. 2 is a perspective view of the lower panel of the device of FIG. 1.

FIG. 3 is a side view of the lower panel of FIG. 1.

FIG. 4 is a top view of the lower panel of FIG. 1.

FIG. 5 shows another gating arrangement according to the present invention.

FIG. 6 is a view of the device of FIG. 5 along line A—A.

DESCRIPTION OF THE INVENTION

The key to the present invention is to mold a gate which can be left within the part or which can be trimmed off and disposed. Preferably, the gate is molded or stamped onto an area of the final part that is not visible after production.

More particularly, the present invention is directed to an improved method for preparing a product by introducing a rigid polyurethane foam formulation into a cavity defined by two spaced apart formed sheets and allowing the formulation to foam. In one embodiment, the improvement resides in providing at least one of the sheets with a portion having the shape of a gate of the type used in polyurethane reaction injection molding and introducing the formulation through that gate so that the formulation enters the cavity as a laminar stream.

The gate can be molded, formed or stamped into one or both of the spaced apart sheets. Alternatively, the gate can be molded, formed or stamped into one of the sheets, and a separate sheet or backer plate attached thereto. Alternatively, the gate can be formed, molded or stamped into the separate sheet or backer plate. Finally, the gate can be molded in a separate part which is attached to one of the spaced apart sheets and thus either becomes a part of the final part or is subsequently removed.

The gate shapes useful herein are known and used in the polyurethane reaction injection molding art. Various gates are known in the art. They include dam gates, fan gates and rod gates. Typical of such gates are those disclosed in U.S. Pat. No. 3,991,147; "REACTION MOLDING," edited by W. E. Becker, Van Nostrand Reinhold Company, 1979, pages 219 through 230; and, "Polyurethane Handbook," edited by G. Oertel, Hanser Publishers, 1994, pages 333 through 335, all the disclosures of which are hereby incorporated by reference.

Depending upon the type of materials used, the appropriate gate shape can be pressed (e.g., in the case of metal) or thermoformed (in the case of plastics). In practice, any suitable material that can be formed or shaped may be used provided the material holds its shape sufficiently to deliver a laminar chemical stream during the introduction of the foamable reaction mixture.

Reference will now be made to the drawings in order to more clearly explain the invention. In FIGS. 1 through 4, a lower panel, 1, is molded (or otherwise shaped) in the form shown. the flat top panel, 2, is placed over panel 1 and the combination is placed in a suitable press (not shown) which will hold the upper and lower panels in place during foaming. In practice (e.g., in producing a refrigerator panel), side panels (not shown) would also be provided. The lower panel, 1, has a channel, 4, and a fan gate, 3, formed therein (such as by molding or pressing). The areas 5 are formed such that they will come into contact with the under surface of the upper panel 2. When production of the part is to begin, foam chemicals are injected through the channel 4, pass through the gate region, 3, and into the cavity, 6, formed between the upper and lower panels.

FIGS. 5 and 6 shows another embodiment of the present invention, where both the top and lower panels are appropriately shaped. In FIGS. 5 and 6, the gate is a dam gate.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a method of preparing a product by introducing a rigid polyurethane foam formulation into a cavity defined by two spaced apart, rigid formed sheets and allowing the formulation to foam, the improvement wherein at least one of said sheets is provided with a portion having the shape of a gate of the type used in polyurethane reaction injection molding wherein a separate sheet or backer plate is attached to at least one of said sheets with said portion formed in said separate sheet or backer plate and wherein said formulation is introduced through said gate so that said formulation enters said cavity as a laminar stream.

2. In a method of preparing a product by introducing a rigid polyurethane foam formulation into a cavity defined by two spaced apart, rigid formed sheets and allowing the formulation to foam, the improvement wherein at least one of said sheets is provided with a portion having the shape of a gate of the type used in polyurethane reaction injection molding wherein said portion is formed in at least one of said sheets and wherein a separate sheet or backer plate is attached to at least one of said sheets and wherein said formulation is introduced through said gate so that said formulation enters said cavity as a laminar stream.

3. In a method of preparing a product by introducing a rigid polyurethane foam formulation into a cavity defined by two spaced apart, rigid formed sheets and allowing the formulation to foam, the improvement wherein said formulation is passed through a separately formed single use molding which is in contact with at least one of said two spaced apart, rigid formed sheets and which remains with the final product and which molding has the shape of a gate of the type used in polyurethane reaction injection molding and wherein said formulation is introduced through said gate so that said formulation enters said cavity as a laminar stream.

* * * * *